US012451269B2

(12) United States Patent
Gemme

(10) Patent No.: US 12,451,269 B2
(45) Date of Patent: Oct. 21, 2025

(54) DUAL COAX NETWORK WITH POWER DISTRIBUTION AND MID-SPAN TAP FOR SIGNALS AND/OR POWER FROM SAME

(71) Applicant: CommScope Technologies LLC, Hickory, NC (US)

(72) Inventor: Christopher P. Gemme, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 502 days.

(21) Appl. No.: 17/838,144

(22) Filed: Jun. 10, 2022

(65) Prior Publication Data
US 2022/0301742 A1    Sep. 22, 2022

Related U.S. Application Data

(63) Continuation of application No. PCT/US2020/062531, filed on Nov. 29, 2020.
(Continued)

(51) Int. Cl.
*H01B 11/06* (2006.01)
*H01R 9/05* (2006.01)

(52) U.S. Cl.
CPC ........... *H01B 11/06* (2013.01); *H01R 9/0509* (2013.01)

(58) Field of Classification Search
CPC . H04B 3/56; H04B 3/548; H04B 3/54; H01B 11/06; H01R 9/0509
See application file for complete search history.

(56) References Cited

U.S. PATENT DOCUMENTS 4,120,554 A    10/1978    Bianchi et al.
4,266,842 A     5/1981    Dillon, Jr. et al.
(Continued)

FOREIGN PATENT DOCUMENTS

CA    3054359 A1 *    8/2018    ........... F28D 7/0041
CN    101944649 A *   1/2011
(Continued)

OTHER PUBLICATIONS

Wilson,Gordon et al., "FiberVista: An FTTH or FTTC system delivering broadband data and CATV services," Bell Labs Tech Journal, Jan. 1, 1999, pp. 300-312.
(Continued)

*Primary Examiner* — Jean F Duverne
(74) *Attorney, Agent, or Firm* — Muncy, Geissler, Olds & Lowe, P.C.

(57) ABSTRACT

A communication network includes first and second coaxial cables. The first cable transmits forward path, downstream signals to customer devices. The second cable receives reverse path, upstream signals from customer devices. In a preferred embodiment, the downstream bandwidth exceeds 500 MHz and the upstream bandwidth exceeds 500 MHz, such as frequencies of 5 to 550 MHz in both the downstream and upstream directions. A power inserter provides a ground to first and second shielding layers of the first and second cables, a first part of a differential power signal to a center conductor of the first cable and a second part of the differential power signal to a center conductor of the second cable. A tap is also provided for the dual coaxial system, so as to provide access to the signals and/or power of the first and second cables without terminating the first and second cables.

20 Claims, 8 Drawing Sheets

Related U.S. Application Data

(60) Provisional application No. 62/947,450, filed on Dec. 12, 2019.

(56) References Cited

U.S. PATENT DOCUMENTS

| | | | |
|---|---|---|---|
| 4,512,619 | A | 4/1985 | Dechelette |
| 4,588,249 | A | 5/1986 | Blichasz et al. |
| 4,614,394 | A | 9/1986 | Chelin |
| 4,691,976 | A | 9/1987 | Cowen |
| 4,701,001 | A | 10/1987 | Verhoeven |
| 4,738,009 | A | 4/1988 | Down et al. |
| 4,809,424 | A | 3/1989 | Bianchi et al. |
| 4,904,204 | A | 2/1990 | Heng et al. |
| 5,083,934 | A | 1/1992 | Kawaguchi |
| 5,281,933 | A | 1/1994 | Chamberlin |
| 5,362,251 | A | 11/1994 | Bielak |
| 5,919,059 | A | 7/1999 | Bozzer et al. |
| 5,945,634 | A | 8/1999 | Shimirak et al. |
| 8,947,319 | B2 | 2/2015 | Simmons et al. |
| 2015/0067755 | A1 | 3/2015 | Conroy et al. |
| 2015/0078756 | A1 | 3/2015 | Soto et al. |
| 2021/0175926 | A1* | 6/2021 | Henry .................. H01P 5/103 |

FOREIGN PATENT DOCUMENTS

| | | |
|---|---|---|
| EP | 2642600 B1 | 4/2018 |
| FR | 2566968 A1 | 1/1984 |
| FR | 2600217 A1 | 12/1987 |
| GB | 830154 A | 2/1960 |
| WO | WO2018156307 A * | 8/2018 |

OTHER PUBLICATIONS

Hariharan, Satheesh et al., "Powering Small Cells Over Twisted Pair or Coax Cables," IEEE INTELEC, Oct. 7, 2018, pp. 1-6.

* cited by examiner

DUAL COAX NETWORK WITH POWER DISTRIBUTION AND MID-SPAN TAP FOR SIGNALS AND/OR POWER FROM SAME

This application is a continuation of International Application No. PCT/US2020/062531, filed Nov. 29, 2020, which claims the benefit of U.S. Provisional Application No. 62/947,450, filed Dec. 12, 2019, both of which are herein incorporated by reference.

BACKGROUND OF THE INVENTION

1. Field of the Invention

The present invention relates to a communication network employing first and second coaxial cables to provide downstream and upstream communications between a service provider and customer devices and to provide power over the coaxial cables for auxiliary units, like 5G small cell sites. The present invention also relates to a tap unit for accessing conductors of the coaxial cables mid-span, without terminating the coaxial cables.

2. Description of the Related Art

As shown in FIG. 1, communications networks often transmit cable television (CATV) signals and/or other information, like broadband Internet and/or telephone services, between a service provider center 11 and a plurality of subscribers 13-1, 13-2, 13-3, . . . , 13-x over a combination of optical fiber cable 15 and/or coaxial cable 19. Such networks are often referred as hybrid fiber-coaxial ("HFC") networks. In an HFC network, fiber optic cables 15 are typically used to carry signals from the facilities of the service provider center 11 to various distribution hubs 17 including optical nodes 18, and repeaters 16 may be located between the service provider center 11 and the distribution hubs 17, e.g., spaced one to several miles apart. Less expensive coaxial cables 19 are used to carry the signals from the distribution hubs 17 into regions (many miles), into neighborhoods (several miles) and/or into individual homes or businesses (usually well less than a mile). Often times, the HFC network is also referred to as a Fiber-to-the-x ("FTTx") network, wherein x is the name of the distribution point 17, where the signal on optical fiber cable is transferred to a signal on a coaxial cable. For example, Fiber-to-the-curb ("FTTC") and Fiber-to-the-home ("FTTH") are commonly used acronyms.

When the length of the coaxial cable 19 between the distribution hub 17 and the subscriber 13-x exceeds a particular length, for example 2,500 feet, one or more amplifiers 21 are needed. The amplifier 21 boosts up the communication signal carried on the center conductor of the coaxial cable 19, so that the signal can continue along the length of the coaxial cable 19 without suffering attenuation levels, which might lead to data errors or quality of service issues. The amplifiers 21 need power to operate. Often times, a power source is not located conveniently to the amplifier's installed location, e.g., at intervals of 2,500 along an expanse of coaxial cable 19.

In the background art, the distribution hub 17 is typically located adjacent to a reliable power source. The distribution hub 17 has lots of electronic equipment housed inside of a weather resistant cabinet, such as the optical node 18 (including optical-to-electrical converters (O/E converters) and electrical-to-optical converters (E/O converters)), cooling/heating and humidity regulating systems to maintain a suitable environment within the cabinet, and a power back up system, like batteries and associated recharging equipment. Within the cabinet of the distribution hub 17 is also housed a power inserter. The power inserter, which may be part of the optical node 18 or separate from the optical node 18, adds a differential power signal to the center conductor and shielding layer of the coaxial cable 19, where the center conductor receives a first part of the differential power signal and the shielding layer receives a second part of the differential power signal. Typically, the power signal is an alternating current (AC) power signal of less than ninety volts, like an eighty nine volt signal at sixty hertz, having a saw tooth or trapezoidal shape.

The AC power signal is used by the amplifiers 21 to amplify the radio frequency (RF) signals on the center conductor, as the RF signals are sent in the upstream and downstream directions away from the amplifier 21. The service provider is often a cable television company that may have exclusive rights to offer cable television services in particular geographic areas. The subscribers 13-x in a cable television network may include, for example, individual homes, apartments, hotels, colleges, and various businesses and other entities. The cable television service provider may offer subscribers 13-x a variety of different services. By way of example, the services might include basic television, premium television (including pay-per-view and movies-on-demand), broadband Internet service, and digital telephone service.

A tap 23 refers to a unit placed very close to one or more subscribers 13-x, such as individual homes or a business. The tap 23 is connected to the coaxial cable 19 and has one or more end-user ports. A smaller diameter coaxial cable 19A, like RG6, is attached to the end user port and runs into the house or business for attachment to the end user's devices, like a computer modem, TV tuner, Internet telephone, DVR, etc. The tap 23 removes the AC power signal, so that the AC power signal is not present at the end user ports and not sent into the end user's home or business.

Current CATV networks carry downstream information from the distribution hub 17 to a particular subscriber, e.g., subscriber 13-1, and upstream information from the particular subscriber 13-1 to the distribution hub 17 over a serial connection of singular coaxial cables 19 and 19A. The service provider transmits "forward path" or "downstream" signals from the service provider center 11 to the particular subscriber 13-1. "Reverse path" or "upstream" signals are transmitted from the particular subscriber 13-1 back to the service provider center 11. In the United States, the forward path signals are typically transmitted in the 54-1,002 MHz frequency band, and may include, for example, different tiers of cable television channels, movies on demand, digital telephone and/or Internet service, and other broadcast or point-to-point offerings. The reverse path signals are typically transmitted in the 5-42 MHz frequency band and may include, for example, signals associated with digital telephone and/or Internet service and ordering commands, i.e., for movies-on-demand and other services.

SUMMARY OF THE INVENTION

The Applicant has appreciated that there has been a constant push to increase the bandwidth of both the forward path and the reverse path over the single coaxial cable path that links the distribution hub 17 to the particular subscriber 13-1. More bandwidth in the forward path is needed as more channels, entertainment options, and higher definition videos are provided to customers. More reverse path bandwidth is needed as customers begin to host more Internet services and post/stream high definition videos to security services and social media.

One solution is to simply expand the frequency bands of the forward and reverse paths. However, increasing the frequency bands to include frequencies above 1 GHz, e.g., 1.8 GHz, diminishes signal performance, as attenuation increases significantly in a coaxial cable at higher frequencies, which reduces the distance that a signal can travel through the coaxial cable. Also, higher frequencies can interfere with other communication networks in the area, e.g., LTE networks.

In current CATV networks, frequency division multiple access (FDMA) is used over the single cable, where the forward path and reverse path use different frequency bands on the same cable. A FDMA scheme causes the amplifiers 21 to require diplexers, so that the downstream and upstream amplification of the forward path and reverse path within the amplifiers 21 does not cause a feedback loop. The diplexers complicate the design of amplifiers 21 and require tuning, which can be labor intensive.

Another solution would be to employ sophisticated multiplexing schemes on the single coaxial cable so that the forward path and reverse path frequency bands may overlap, such as time division multiple access (TDMA), code division multiple access (CDMA), or some of the schemes proposed in DOCSIS 3.0, 3.1 and 3.x. In such circumstances, the amplifiers 21 would need to be much more sophisticated, e.g., managed by a CPU, in order to separate and properly amplify the forward path and the reverse path without signal derogation or feedback.

To this end, it is proposed by the Applicant to run a second coaxial cable from the distribution hub 17 to each of the plurality of subscribers 13-1, 13-2, 13-3, . . . , 13-x. The dual coaxial communication system will allow greater band width in the forward and reverse paths, e.g., even equal bandwidth in the forward and reverse paths. Also, the frequency bandwidths may overlap without complicating the amplifiers 21. Actually, amplifiers may possibly be omitted in the present invention, but if used, could be made with a more simple design since diplexers would no longer be needed.

The dual coaxial communication system will allow a greater power level, e.g., higher voltages and/or amperages, to be carried over the two coaxial cables, such as a 240 volt sinusoidal signal with the shielding layer of both coaxial cables being at a common ground voltage, the center conductor of the first coaxial cable presenting a positive 120 volt AC signal and the center conductor of the second coaxial cable presenting a negative, e.g., opposite phase, 120 volt AC signal. The power signal may also be a direct current (DC) power signal, such as a positive 190 volt DC signal on the center conductor of the first coaxial cable and a negative 190 volt DC signal on the center conductor of the second coaxial cable, for total voltage differential of 380 volts DC, while the shielding layers may be commonly grounded. The added power could be used to power auxiliary units, such as 5G small cell sites, and/or to power amplifiers distributed along the length of the two coaxial cables. The top frequency of the forward path band can be lowered, which will also lead to less attenuation in the coaxial cable and longer cable runs between a distribution hub 17 and a tap 23, between amplifiers 21 and/or between an amplifier 21 and a tap 23. The lower frequencies may also lead to less interference with other communication networks, e.g., cordless phones, Wifi, LTE networks.

In the existing arts, the tap 23 includes a conductive metallic outer housing. One embodiment of the present invention provides a dielectric housing with a conductive inner layer. A dielectric outer housing may be less susceptible to the elements, corrosion and water intrusion.

These and other objects are accomplished by a communication network comprising: a first coaxial cable including a first center conductor surrounded by a first dielectric layer which is in turn surrounded by a first shielding layer, said first coaxial cable for transmitting forward path, downstream signals to customer devices; a second coaxial cable including a second center conductor surrounded by a second dielectric layer which is in turn surrounded by a second shielding layer, said second coaxial cable for receiving reverse path, upstream signals from customer devices; and a power inserter for presenting a common ground to said first and second shielding layers of said first and second coaxial cables, for presenting a first part of a differential power signal to a center conductor of said first coaxial cable and a second part of said differential power signal to a center conductor of said second coaxial cable.

Moreover, these and other objects are accomplished by a communication network comprising: a first coaxial cable including a first center conductor surrounded by a first dielectric layer which is in turn surrounded by a first shielding layer, said first coaxial cable for transmitting forward path, downstream signals to customer devices; a second coaxial cable including a second center conductor surrounded by a second dielectric layer which is in turn surrounded by a second shielding layer, said second coaxial cable for receiving reverse path, upstream signals from customer devices; and a distribution hub for presenting downstream signals to said first coaxial cable having a bandwidth exceeding 500 MHz and for receiving upstream signals from said second coaxial cable having a bandwidth exceeding 500 MHz.

Further, these and other objects are accomplished by a tap for a dual coaxial system comprising: a housing for allowing first and second coaxial cables to pass therethrough without terminating either of the first or second coaxial cables; a first probe for engaging a center conductor of the first coaxial cable; a second probe for engaging a center conductor of the second coaxial cable; shielding layer probes for engaging shielding layers of the first and second coaxial cables; and at least one port connected to said first and second probes and said shielding layer probes, wherein said at least one port is accessible on an outside of said housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
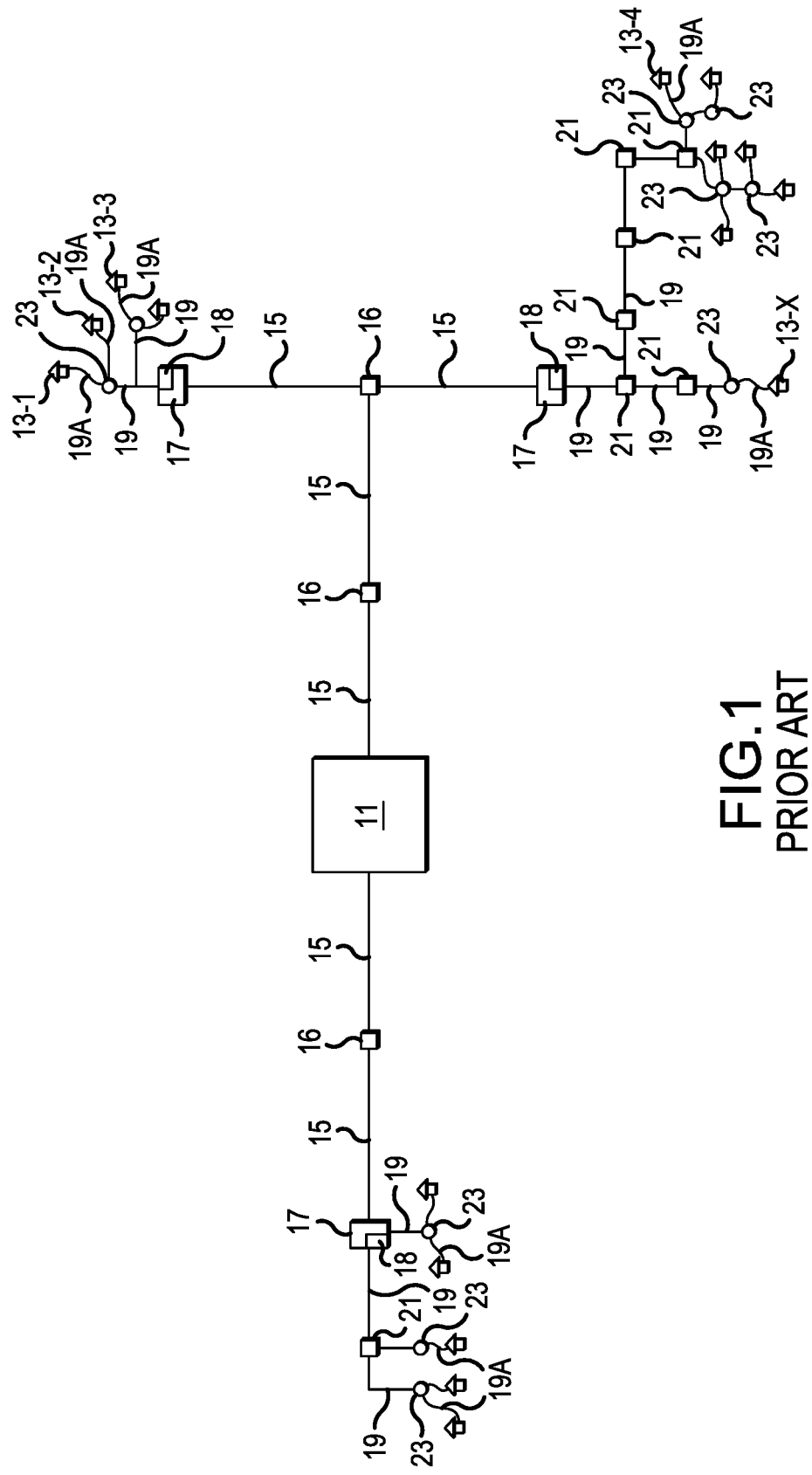
FIG. 1 is a block diagram showing a hybrid fiber coaxial (HFC) network, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
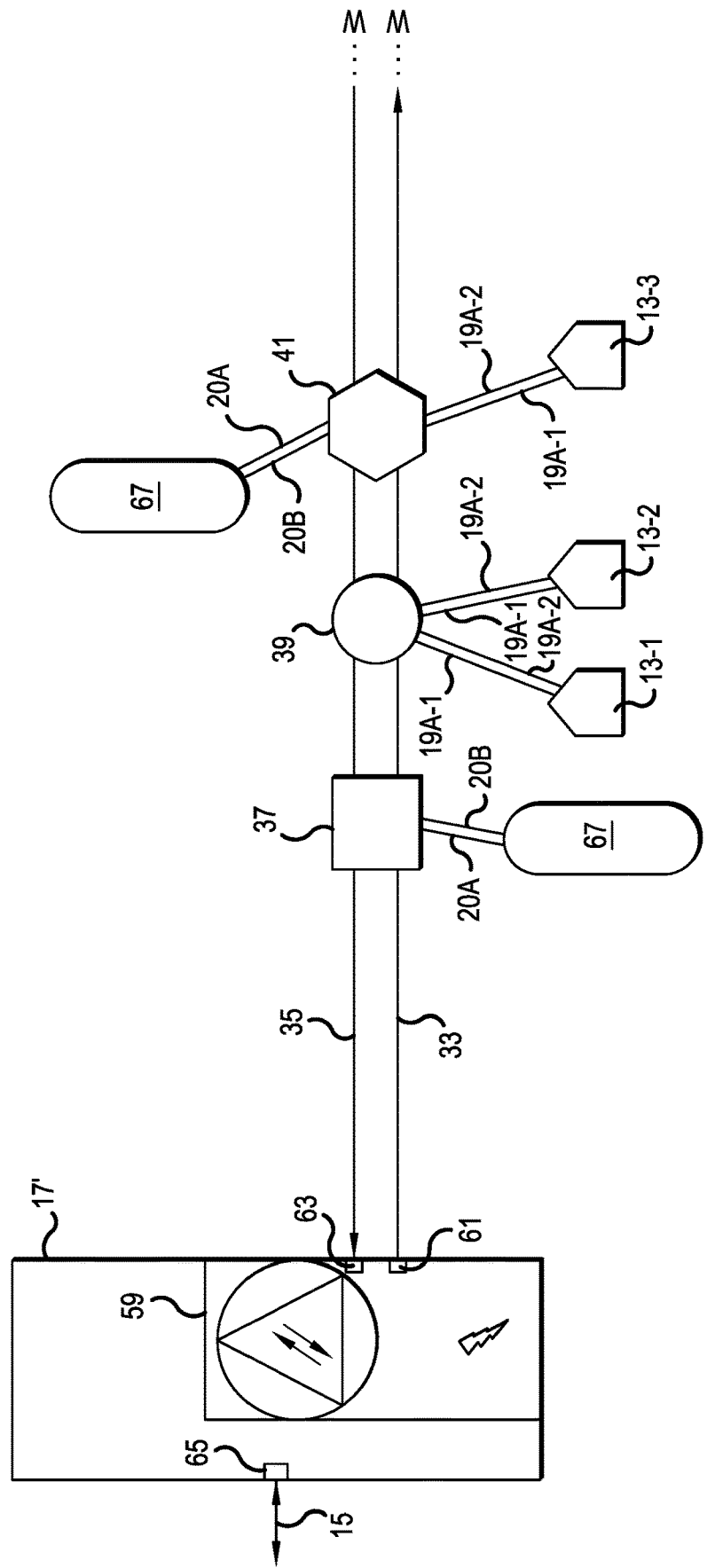
FIG. 2 is a block diagram showing a new dual coaxial communication network, in accordance with the present invention.

FIG. 2 is a block diagram showing a new dual coaxial communication network 31, in accordance with the present invention. The communication network 31 includes a first coaxial cable 33 and a second coaxial cable 35. The first coaxial cable 33 is provided for transmitting forward path, downstream signals to customer devices. The second coaxial cable 35 is provided for receiving reverse path, upstream signals from customer devices. First, second and third taps 37, 39 and 41 are attached to the first and second coaxial cables 33 and 35.

Figure 3:
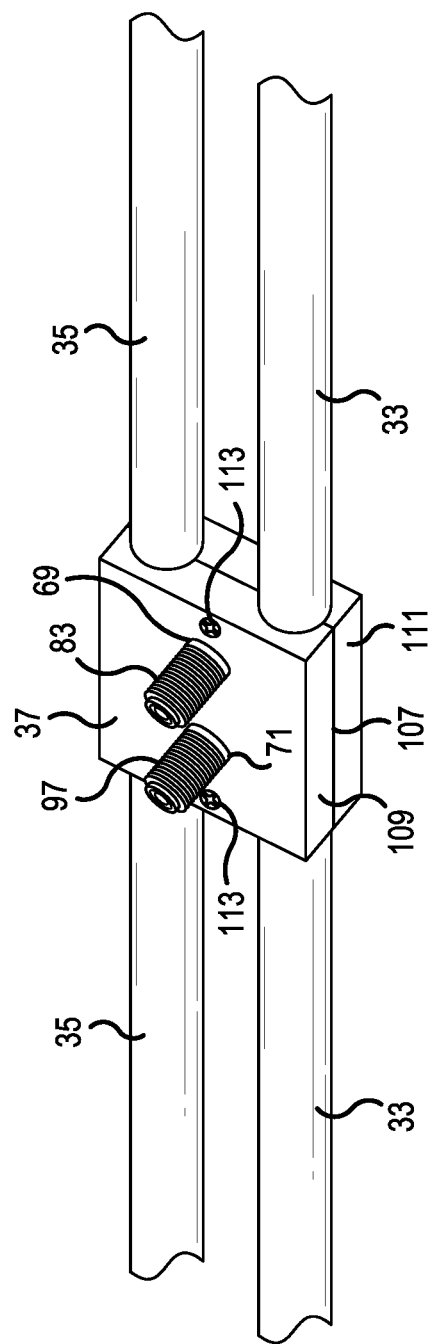
FIG. 3 is a perspective view of a first tap in FIG. 2.
Figure 4:
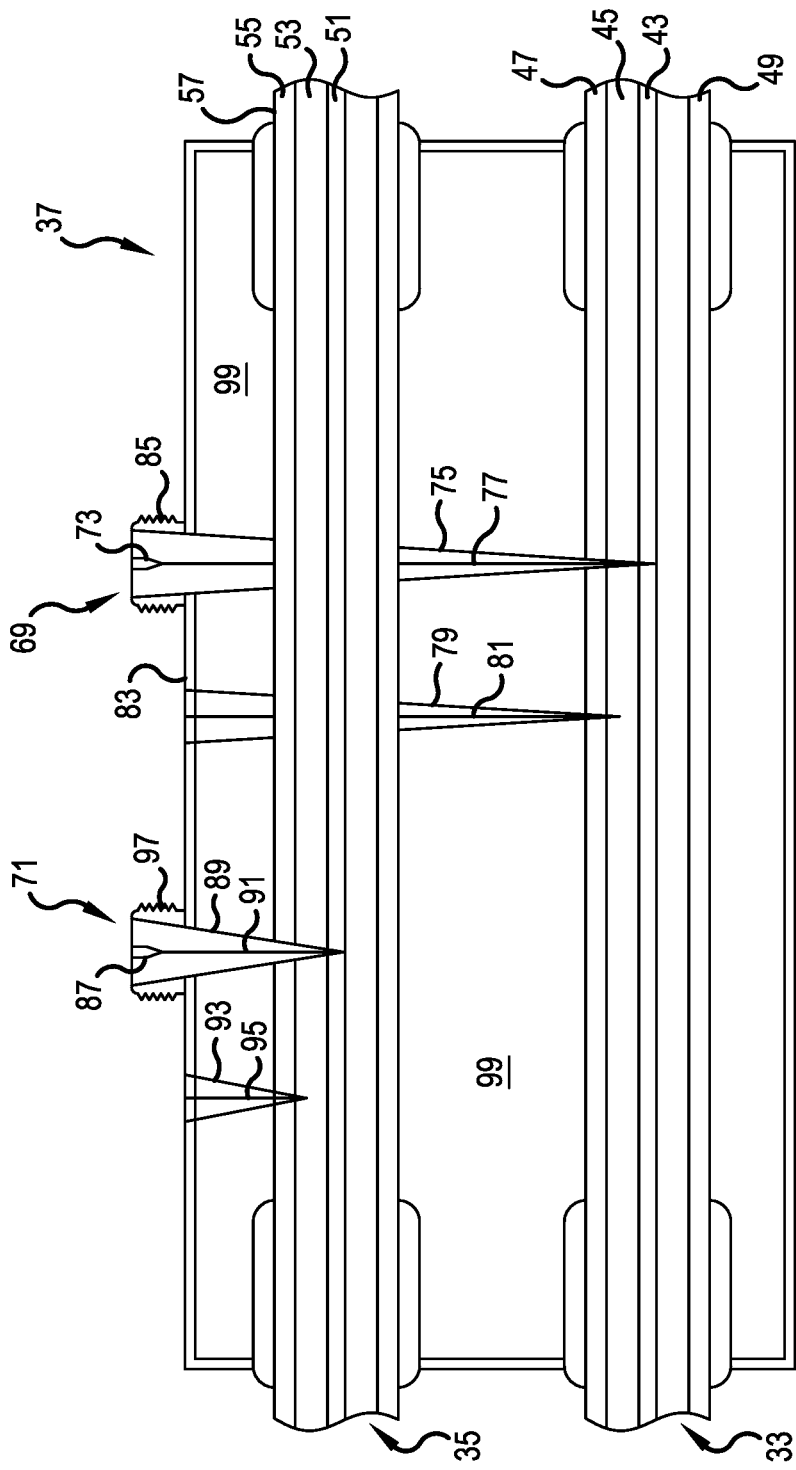
FIG. 4 is a block diagram depicting the interconnections within the first tap.

FIG. 3 is a perspective view of the first tap 37 and FIG. 4 is a block diagram depicting the inter connections within the first tap 37. The first coaxial cable 33 passes through the first tap 37 without being terminated. The first coaxial cable 33 includes a first center conductor 43 surrounded by a first dielectric layer 45 which is in turn surrounded by a first shielding layer 47, which is surrounded by a first insulating outer jacket 49. The second coaxial cable 35 also passes through the first tap 37 without being terminated. The second coaxial cable 35 includes a second center conductor 51 surrounded by a second dielectric layer 53 which is in turn surrounded by a second shielding layer 55, which is surrounded by a second insulating outer jacket 57.

Referring back to FIG. 2, an optical node 59 including a power inserter presents a common ground to the first and second shielding layers 47 and 55 of the first and second coaxial cables 33 and 35. The power inserter presents a first part of a differential power signal to the first center conductor 43 of the first coaxial cable 33 and a second part of the differential power signal to the second center conductor 51 of the second coaxial cable 35.

The optical node 59 including the power inserter may replace the optical node 18 including the power inserter of FIG. 1, and the power inserter may be a separate unit from the optical node 59, if desired. More specifically, the optical node 59 including the power inserter may be housed within a distribution hub 17'. The distribution hub 17' may include one or more downstream ports 61 for communicating the downstream signals to one or more attached first coaxial cables 33. The distribution hub 17' may also include one or more upstream ports 63 for receiving the upstream signals from one or more attached second coaxial cables 35. The distribution hub 17' would also include one or more optical fiber ports 65 to communicate with a service provider center 11.

In one embodiment, the power inserter may present a differential power signal in the form of a DC voltage, such as a positive DC voltage, e.g., +90 volts or +120 volts or +180 volts, to the first center conductor 43 of the first coaxial cable 33 and a negative DC voltage, e.g., −90 volts or −120 volts or −180 volts, to the second center conductor 51 of the second coaxial cable 35. Of course, the polarity could be reversed with the positive voltage being associated with the second center conductor 51 of the second coaxial cable 35 and the negative voltage being associated with the first center conductor 43 of the first coaxial cable 33. In either instance, a reference ground may be supplied to the first and second shielding layers 47 and 55 of the first and second cables 33 and 35.

Further, the power inserter may present a differential power signal in the form of an AC signal, e.g., +120 volts AC, to the first center conductor 43 of the first coaxial cable 33 and a −120 volts AC signal, e.g., opposite phase, to the second center conductor 51 of the second coaxial cable 35. A reference ground may be supplied to the first and second shielding layers 47 and 55 of the first and second cables 33 and 35. In such an instance, the first and second coaxial cables 33 and 35 may supply either a 120 volts AC signal or a 240 volts AC signal, depending upon whether the power is tapped between one of the first and second center conductors 43 or 51 and the ground, or between the first and second center conductors 43 and 51, respectively. The power supplied by the first and second coaxial cables 33 and 35, whether AC or DC, may be used to power auxiliary devices, such as a 5G small cell site 67, or other devices, such as WiFi devices, security cameras, etc.

The optical node 59 of the distribution hub 17' also presents the downstream communication signals to the first coaxial cable 33 and receives the upstream communication signals from the second coaxial cable 35. In a preferred embodiment, a bandwidth of the downstream signals exceeds 500 MHz and a bandwidth of the upstream signals exceeds 500 MHz. For example, a frequency range for the downstream signals on the first coaxial cable 33 includes the frequencies of 5 to 550 MHz, and a frequency range for the upstream signals on the second coaxial cable 35 includes the frequencies of 5 to 550 MHz. By lowering the frequency ranges for the upstream and/or downstream signals, less attenuation occurs in the first and second coaxial cables 33 and 35. Also, the lower frequencies may lead to less interference with other communication networks, e.g., cordless phones, Wifi, LTE networks. In fact, one of the upstream and downstream frequency bands, e.g., the upstream frequency band, may be moved lower than the other frequency band to include frequencies in the KHz range. Alternatively, both the upstream and downstream frequencies band may be expanded into lower frequencies ranges in the KHz range, such as 500 KHz to 500 MHz.

Referring back to FIGS. 3 and 4, the first tap 37 may include first and second ports 69 and 71 in the form of female f-type ports, accessible on an outside of a housing of the first tap 37. A first pin clamp 73 within the first port 69 is electrically connected to a first probe 75. The first probe 75 has a first conductive core 77 which penetrates the first outer jacket 49, the first shielding layer 47 and the first dielectric layer 45 to establish an electrical connection between the first pin clamp 73 and the first center conductor 43. The outer surfaces of the first probe 75 are either non-conductive or distanced from the first shielding layer 47, so that no electrical connection is made between the first conductive core 77 and first shielding layer 47. A second probe 79 has a second conductive core 81 which penetrates the first outer jacket 49 to establish an electrical connection between a conductive outer housing 83 of the first tap 37 and the first shielding layer 47 to act as a shielding layer probe. The conductive outer housing 83 is electrically connected to outer threads 85 of the first port 69.

A second pin clamp 87 within the second port 71 is electrically connected to a third probe 89. The third probe 89 has a third conductive core 91 which penetrates the second outer jacket 57, the second shielding layer 55 and the second dielectric layer 53 to establish an electrical connection between the second pin clamp 87 and the second center conductor 51. The outer surfaces of the third probe 89 are either non-conductive or distanced from the second shielding layer 55, so that no electrical connection is made between the third conductive core 91 and second shielding layer 55. A fourth probe 93 has a fourth conductive core 95 which penetrates the second outer jacket 57 to establish an electrical connection between the conductive outer housing 83 of the first tap 37 and the second shielding layer 55 to act as a shielding layer probe. The conductive outer housing 83 is electrically connected to outer threads 97 of the second port 71.

The first tap 37 would send both power and communication signals to the first and second ports 69 and 71. Such an arrangement may be desirable where the auxiliary device needs a communication path in addition to a power source. However, if the auxiliary device needs only a power connection, e.g., has a wireless connection or a fiber connection for data transfer, the first tap 37 may include filters to allow only the power signals to pass to the first and second ports 69 and 71. In other words, the filters would block the upstream and downstream communication frequencies and function as RF blocking circuitry. As depicted in FIG. 2, the 5G small cell site 67 is connected to the first tap 37 by first and second power carrying coaxial cables 20A and 20B, connected to the first and second ports 69 and 71, respectively.

Figure 5:
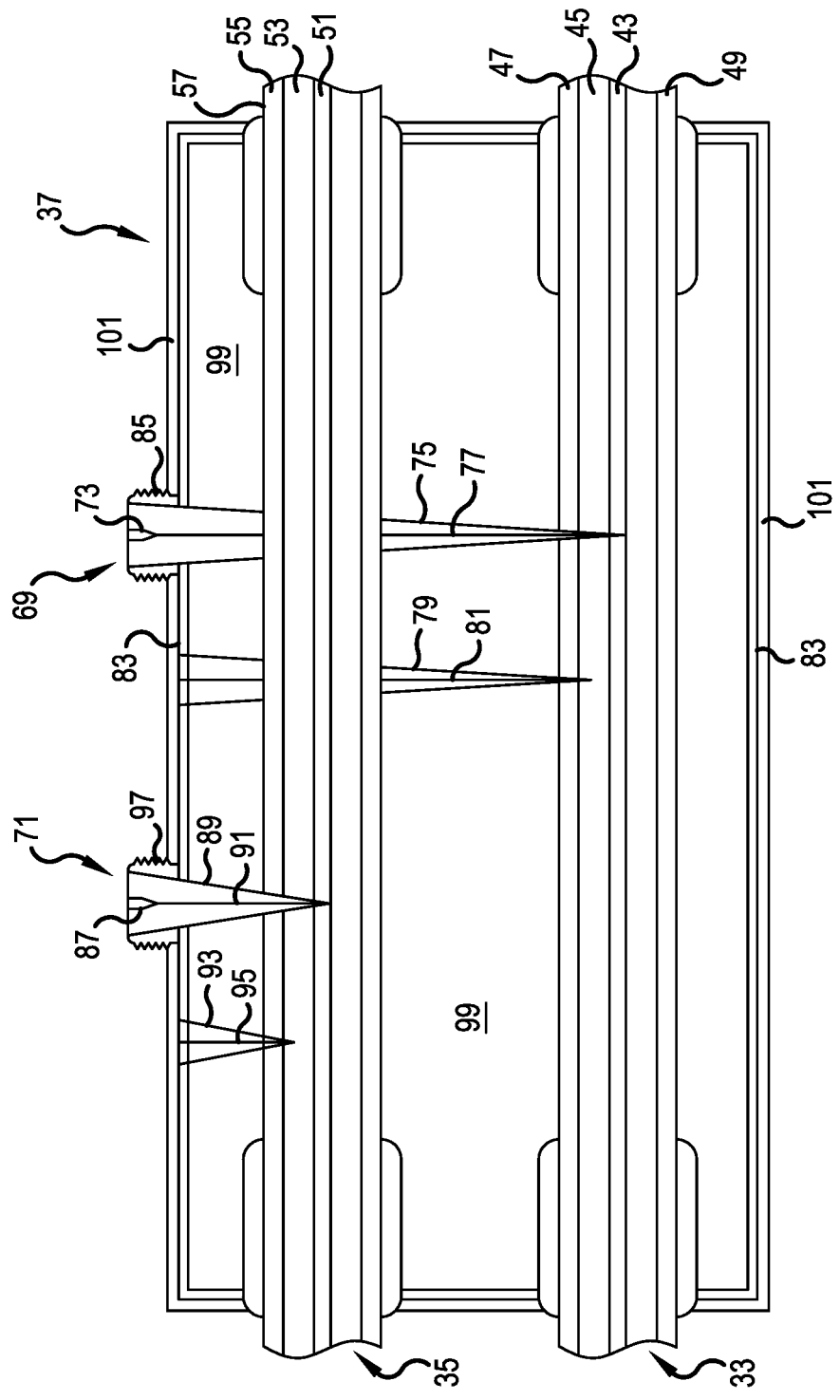
FIG. 5 shows the first tap of FIG. 4 with a plastic non-conductive shell with a shielding layer on an inner surface of the shell.

In a preferred embodiment, the interior of the conductive outer housing 83 is filled with a water blocking gel 99, optionally containing antioxidants, corrosion inhibitors and/or, fungicides. A suitable gel would include Octopus™ Sealing Technology gel by CommScope, Inc. of Hickory, North Carolina. In another preferred embodiment, the conductive outer housing 83 is replaced by a conductive inner lining or layer 83', like a foil or coating of shielding material, formed on the inner surfaces of a non-conductive, dielectric, plastic outer shell 101, as depicted in FIG. 5. The plastic outer shell 101 would be more immune to corrosion if exposed to damp or harsh environments and might form a better seal to the environment. All other elements in FIG. 5 are the same as described in conjunction with FIG. 4.

Figure 6:
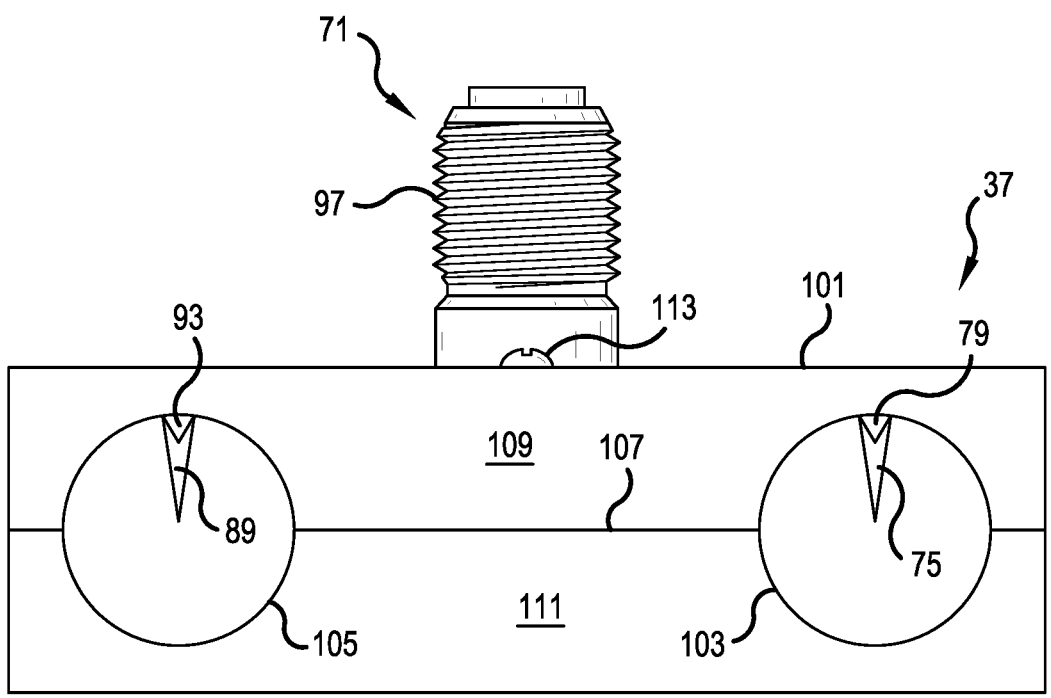
FIG. 6 is a left side end view of the first tap in an empty and assembled condition.

FIG. 6 is a left side end view of the first tap 37 (from the perspective of FIG. 3) in an empty and assembled condition. FIG. 6 illustrates the positioning of the first, second, third and fourth probes 75, 79, 89 and 93 within first and second openings 103 and 105 in the plastic outer shell 101 prior to the installation of the first and second coaxial cables 33 and 35. A break line 107 divides the plastic outer shell 101 into an upper half shell 109 and a lower half shell 111. The break line 107 passes through the middles of the first and second openings 103 and 105, so that the first and second coaxial cables 33 and 35 can be assembled into the first tap 37 without cutting either of the first or second coaxial cables 33 and 35. Screws 113 may be used to secure the upper half shell 109 to the lower half shell 111.

The first, second, third and fourth probes 75, 79, 89 and 93 are shown by way of illustration only, as other structures for probing the center conductor and/or the shielding layer may be substituted for the depicted first, second, third and fourth probes 75, 79, 89 and 93. For example, the probing structures for coaxial cables shown in U.S. Pat. Nos. 4,120,554; 4,266,842; 4,512,619; 4,588,249; 4,614,394; 4,691,976; 4,701,001; 4,738,009; 4,809,424; 4,904,204; 5,083,934; 5,203,721; 5,281,933; 5,362,251; 5,919,059; 5,945,634 and 8,947,319, each of which is herein incorporated by reference, may be used in conjunction with the present invention.

Figure 7:
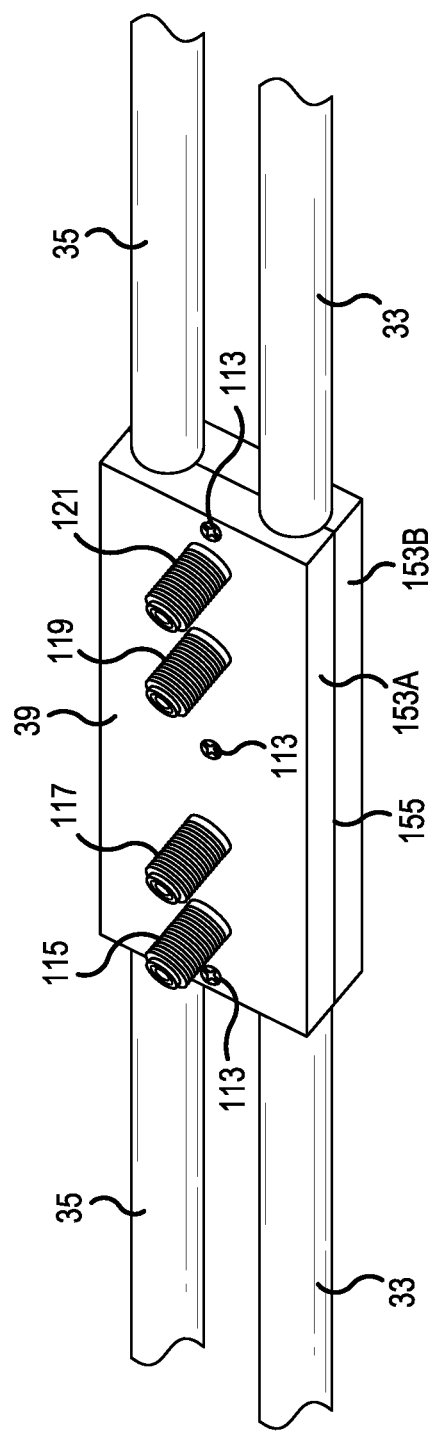
FIG. 7 is a perspective view of second and third taps in FIG. 2.

FIG. 7 is a perspective view of the second tap 39. The second tap 39 has the same functionality as the conventional tap 23 of FIG. 1, except that the second tap 39 is designed to function in the dual coaxial network of the present invention. The primary function of the second tap 39 is to connect only the upstream and downstream communication signals to drop lines connected to a customer's home or business and to block any power transmission from entering the customer's home or business.

Figure 8:
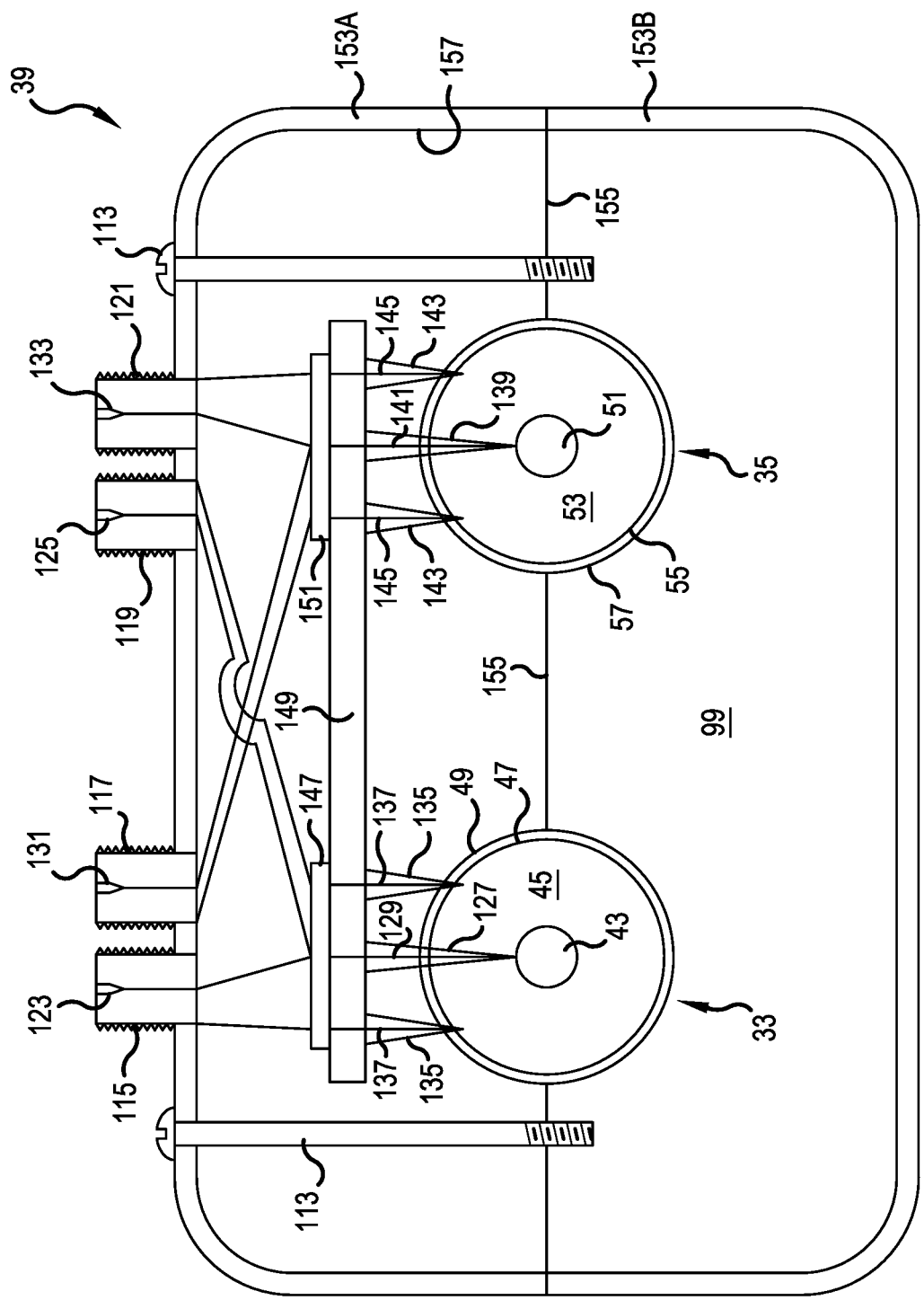
FIG. 8 is a block diagram depicting the interconnections within the second and third taps.

FIG. 8 is a block diagram depicting the inter connections within the second tap 39. The first coaxial cable 33 passes through the second tap 39 without being terminated. The second coaxial cable 35 also passes through the second tap 39 without being terminated.

The second tap 39 may include third, fourth, fifth and sixth ports 115, 117, 119 and 121 in the form of female f-type ports, with third, fourth, fifth and sixth pin clamps 123, 131, 125 and 133, respectively housed therein. The third pin clamp 123 within the third port 115 and the fifth pin clamp 125 within the fifth port 119 are electrically connected to a fifth probe 127. The fifth probe 127 has a fifth conductive core 129 which penetrates the first outer jacket 49, the first shielding layer 47 and the first dielectric layer 45 to establish an electrical connection between the third and fifth pin clamps 123 and 125 and the first center conductor 43. The outer surfaces of the fifth probe 127 are either non-conductive or distanced from the first shielding layer 47, so that no electrical connection is made between the fifth conductive core 129 and the first shielding layer 47. Sixth probes 135 have sixth conductive cores 137 which penetrate the first outer jacket 49 to establish an electrical connection between the first shielding layer 47 and outer threads of the third and fifth ports 115 and 119.

The fourth pin clamp 131 within the fourth port 117 and the sixth pin clamp 133 within the sixth port 121 are electrically connected to a seventh probe 139. The seventh probe 139 has a seventh conductive core 141 which penetrates the second outer jacket 57, the second shielding layer 55 and the second dielectric layer 53 to establish an electrical connection between the fourth and sixth pin clamps 131 and 133 and the second center conductor 51. The outer surfaces of the seventh probe 139 are either non-conductive or distanced from the second shielding layer 55, so that no electrical connection is made between the seventh conductive core 141 and the second shielding layer 55. Eighth probes 143 have eighth conductive cores 145 which penetrate the second outer jacket 57 to establish an electrical connection between the second shielding layer 55 and outer threads of the fourth and sixth ports 117 and 121.

First filtering circuitry 147 resides on a circuit board 149. The first filtering circuitry 147 is attached to the fifth and sixth probes 127 and 135 and acts to modify electrical signals received from the fifth and sixth conductive cores 129 and 137 before the electrical signals are passed to the third and fifth pin clamps 123 and 125 and the outer threads of the third and fifth ports 115 and 119. Second filtering circuitry 151 is also residing on the circuit board 149. The second filtering circuitry 151 is attached to the seventh and eighth probes 139 and 143 and acts to modify electrical signals received from the seventh and eighth conductive cores 141 and 145 before the electrical signals are passed to the fourth and sixth pin clamps 131 and 133 and the outer threads of the fourth and sixth ports 117 and 121.

In the case of the second tap 39, the first and second filtering circuitries 147 and 151 serve to block power being transmitted on the first and second coaxial cables 33 and 35 from reaching any of the third, fourth, fifth and sixth ports 115, 117, 119 and 121. The power supplied by the power inserter, whether AC or DC, is not supplied to the subscriber's 13-1 and 13-2, e.g., residential houses. In the case of the second tap 39, only upstream and downstream data signals are passed between the second tap 39 and the subscribers 13-1 and 13-2. For example, smaller diameter coaxial cable, like RG6, is used between the second tap 39 and the subscribers 13-1 and 13-2. For example, first small diameter coaxial cables 19A-1 may carry downstream data, e.g., data from the service provider 11, from the second tap 39 to the subscribers 13-1 and 13-2. The first small diameter coaxial cables 19A-1 are mated to the third and fifth ports 115 and 119 associated with the first coaxial cable 33. Second small diameter coaxial cables 19A-2 may carry upstream data, e.g., data originating from the subscribers 13-1 and 13-2, from the subscribers 13-1 and 13-2 to the second tap 39. The second small diameter coaxial cables 19A-2 are mated to the fourth and sixth ports 117 and 121 associated with the second coaxial cable 35.

In a preferred embodiment, the second tap 39 has a non-conductive, plastic outer shell. A break line 155 divides the plastic outer shell into an upper half shell 153A and a lower half shell 153B. The break line 155 passes through the middles of first and second openings holding the first and second coaxial cables 33 and 35, so that the second tap 39 can be assembled without cutting either of the first or second coaxial cables 33 and 35. Screws 113 may be used to secure the upper half shell 153A to the lower half shell 153B.

A conductive inner layer 157, like a foil or coating, is formed on the inner surfaces of the upper half shell 153A and the lower half shell 153B. In a preferred embodiment, the interior of the second tap 39 is filled with the water blocking gel 99, optionally containing antioxidants, corrosion inhibitors and/or fungicides. A suitable gel would include Octopus™ Sealing Technology gel by CommScope, Inc. of Hickory, North Carolina.

FIGS. 7 and 8 may also serve as a perspective view of the third tap 41, and a block diagram depicting the inter connections within the third tap 41, respectively, however the functioning of the first and second filtering circuitries 147 and 151 is modified, as described below. The third tap 41 is connected to an auxiliary device needing power, like the 5G small cell site 67, by first and second power carrying coaxial cables 20A and 20B. The third tap 41 is also connected to a subscriber 13-3, e.g., a house, by first and second small diameter coaxial cables 19A-1 and 19A-2.

With regard to the third tap 41, FIG. 8 would illustrate the first filtering circuitry 147 blocking RF signals from being transmitted between the third port 115 and the fifth probe 127 and between the threads of the third port 115 and the sixth probes 135. The second filtering circuitry 151 would block RF signals from being transmitted between the fourth port 117 and the seventh probe 139 and between the threads of the fourth port 117 and the eighth probes 143. The first and second circuitries 147 and 151 would permit power to pass therethrough to the third and fourth ports 115 and 117.

In the third tap 41, the first filtering circuitry 147 would block power from being transmitted between the fifth port 119 and the fifth probe 127 and between the threads of the fifth port 119 and the sixth probes 135. The second filtering circuitry 151 would block power from being transmitted between the sixth port 121 and the seventh probe 139 and between the threads of the sixth port 121 and the eighth probes 143. The first and second circuitries 147 and 151 would permit RF signals to pass therethrough to the fifth and sixth ports 119 and 121.

The third and fourth ports 115 and 117 are connected to the 5G small cell site 67 by the first and second power carrying coaxial cables 20A and 20B, while the subscriber 13-3 is connected to the fifth and sixth ports 119 and 121 by the first and second small diameter coaxial cables 19A-1 and 19A-2. Hence, the third tap 41 is an example of a hybrid tap, which can serve both a power-seeking auxiliary device, e.g., the 5G small cell site 67, and also the data-seeking subscriber, e.g., the house 13-3.

FIG. 8 has illustrated a preferred embodiment wherein the second and third taps 39 and 41 have the first and second filtering circuitries 147 and 151 located on the circuit board 149 within the housing 153A and 153B of the first and second taps 39 and 41. However, it would be possible to filter out the RF signal from the power, or the power from the RF signal, within the auxiliary equipment, e.g., the 5G small cell site 67, or within the equipment of the subscriber 13-X. Further, it would be possible to accomplish the filtering within an adapter box interposed between the connection between the second or third tap 39 or 41 and the subscriber 13-X or the auxiliary device.

The first, second and third taps 37, 39 and 41 have been illustrated with either two or four female f-type ports. It would be possible to have taps with the same functionality, but a different number of female f-type ports, such as two ports, four ports, six ports, eight ports, ten ports, twelve ports, fourteen ports, sixteen ports, etc., so as to service multiple power-seeking devices and/or multiple subscriber 13-X from a single tap. Although female f-type ports have been depicted in the figures, other types of ports could be employed while practicing the invention. For example, when the ports are supplying power to an auxiliary device, any known power terminal, as detailed at the Internet site https://en.wikipedia.org/wiki/DC_connector, such as Tamiya connectors, JST RCY connectors, Anderson Powerpole connectors and SAE connectors, may be employed instead of the female f-type coaxial connectors. Further, when the ports are supplying/receiving data, a BNC type port could be used.

The invention claimed is:

1. A communication network providing at least broadband internet services from facilities of a service provider into individual homes or businesses, comprising:
    a first coaxial cable including a first center conductor surrounded by a first dielectric layer which is in turn surrounded by a first shielding layer, said first coaxial cable transmitting forward path, downstream signals to customer devices at the individual homes or businesses;
    a second coaxial cable including a second center conductor surrounded by a second dielectric layer which is in turn surrounded by a second shielding layer, said second coaxial cable receiving reverse path, upstream signals from customer devices at the individual homes or businesses; and
    a power inserter presenting a common ground to said first and/or second shielding layers of said first and/or second coaxial cables, presenting a first part of a differential power signal to said first center conductor of said first coaxial cable and a second part of said differential power signal to said second center conductor of said second coaxial cable, wherein said power signal is sufficient to power a 5G small cell site distributed along a length of the first and second coaxial cables and/or to power an amplifier distributed along the length of the first and second coaxial cables.

2. The communication network according to claim 1, wherein said differential power signal includes a positive 120 volt or positive 190 volt DC signal presented to said first center conductor of said first coaxial cable and a negative 120 volt or negative 190 volt DC signal presented to said second center conductor of said second coaxial cable.

3. The communication network according to claim 1, wherein said differential power signal includes a negative 120 volt or negative 190 volt DC signal presented to said first center conductor of said first coaxial cable and a positive 120 volt or positive 190 volt DC signal presented to said second center conductor of said second coaxial cable.

4. The communication network according to claim 1, wherein said differential power signal includes a positive 120 volt AC signal presented to said first center conductor of said first coaxial cable and a negative 120 volt AC signal presented to said second center conductor of said second coaxial cable.

5. The communication network according to claim 1, wherein a frequency range for the downstream signals includes the frequencies of 5 to 550 MHz.

6. The communication network according to claim 5, wherein a frequency range for the upstream signals includes the frequencies of 5 to 550 MHz.

7. The communication network according to claim 1, wherein a frequency range for the upstream signals includes frequencies in the KHz range.

8. The communication network according to claim 1, further comprising:
    the 5G small cell site receiving power from at least one of said first and second coaxial cables.

9. The communication network according to claim 1, further comprising:
    a distribution hub housing said power inserter, wherein said distribution hub includes one or more downstream ports communicating the downstream signals to one or more attached first coaxial cables, wherein said distribution hub includes one or more upstream ports receiving the upstream signals from one or more attached second coaxial cables, and wherein said distribution hub includes one or more optical fiber ports to communicate with a service provider center.

10. A communication network providing at least broadband internet services from facilities of a service provider into individual homes or businesses, comprising:
    a first coaxial cable including a first center conductor surrounded by a first dielectric layer which is in turn surrounded by a first shielding layer, said first coaxial cable transmitting forward path, downstream signals to customer devices at the individual homes or businesses;
    a second coaxial cable including a second center conductor surrounded by a second dielectric layer which is in turn surrounded by a second shielding layer, said second coaxial cable receiving reverse path, upstream signals from customer devices at the individual homes or businesses; and
    a distribution hub presenting downstream signals to said first coaxial cable having a bandwidth exceeding 500

MHz and receiving upstream signals from said second coaxial cable having a bandwidth exceeding 500 MHz.

11. The communication network according to claim 10, wherein a frequency range for the downstream signals includes the frequencies of 5 to 550 MHz, and wherein a frequency range for the upstream signals includes the frequencies of 5 to 550 MHz.

12. A tap for a dual coaxial system comprising:
a housing for allowing first and second coaxial cables to pass therethrough without terminating either of the first or second coaxial cables;
a first probe for engaging a center conductor of the first coaxial cable;
a second probe for engaging a center conductor of the second coaxial cable;
one or more shielding layer probes for engaging shielding layers of the first and/or second coaxial cables; and
at least one port connected to said first and second probes and said one or more shielding layer probes, wherein said at least one port is accessible on an outside of said housing.

13. The tap according to claim 12, further comprising:
a small cell site connected to said at least one port.

14. The tap according to claim 12, wherein said at least one port includes a first port and a second port accessible on said outside of said housing, said first port being a first female coaxial port with a threaded outer portion of said first port being electrically connected to a first shielding layer probe of said one or more shielding layer probes engaging the shielding layer of the first coaxial cable and a pin clamp of said first port being electrically connected to said first probe, and said second port being a second female coaxial port with a threaded outer portion of said second port being electrically connected to a second shielding layer probe of said one or more shielding layer probes engaging the shielding layer of the second coaxial cable and a pin clamp of said second port being electrically connected to said second probe.

15. The tap according to claim 14, further comprising:
first power blocking circuitry interposed between said first port and the first coaxial cable so that only RF signals may pass from the first coaxial cable to said first port; and
second power blocking circuitry interposed between said second port and the second coaxial cable so that only RF signals may pass from the second coaxial cable to said second port.

16. The tap according to claim 14, further comprising:
first RF blocking circuitry interposed between said first port and the first coaxial cable so that only power signals may pass from the first coaxial cable to said first port; and
second RF blocking circuitry interposed between said second port and the second coaxial cable so that only power signals may pass from the second coaxial cable to said second port.

17. The tap according to claim 14, further comprising:
a third port being a third female coaxial port accessible on said outside of said housing, with a threaded outer portion of said third port being electrically connected to said first shielding layer probe of said one or more shielding layer probes engaging the shielding layer of the first coaxial cable and a pin clamp of said third port being electrically connected to said first probe; and
a fourth port being a fourth female coaxial port accessible on said outside of said housing, with a threaded outer portion of said fourth port being electrically connected to said second shielding layer probe of said one or more shielding layer probes engaging the shielding layer of the second coaxial cable and a pin clamp of said fourth port being electrically connected to said second probe.

18. The tap according to claim 17, further comprising:
first power blocking circuitry interposed between said first port and the first coaxial cable so that only RF signals may pass from the first coaxial cable to said first port;
second power blocking circuitry interposed between said second port and the second coaxial cable so that only RF signals may pass from the second coaxial cable to said second port;
first RF blocking circuitry interposed between said third port and the first coaxial cable so that only power signals may pass from the first coaxial cable to said third port; and
second RF blocking circuitry interposed between said fourth port and the second coaxial cable so that only power signals may pass from the second coaxial cable to said fourth port.

19. The tap according to claim 12, wherein said outside of said housing is formed primarily of a dielectric material to seal said housing from the environment, and an interior of said dielectric housing is lined with a shielding material.

20. The tap according to claim 12, further comprising:
a water blocking gel filling an interior of said housing.

* * * * *